US009058233B1

(12) United States Patent  
Zeng

(10) Patent No.: US 9,058,233 B1  
(45) Date of Patent: Jun. 16, 2015

(54) MULTI-PHASE SOFTWARE DELIVERY

(75) Inventor: Fancong Zeng, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1088 days.

(21) Appl. No.: 13/076,163

(22) Filed: Mar. 30, 2011

(51) Int. Cl.
| | |
|---|---|
| *G06F 9/44* | (2006.01) |
| *G06F 11/00* | (2006.01) |
| *G06F 15/177* | (2006.01) |
| *G06F 9/445* | (2006.01) |
| *G06F 11/07* | (2006.01) |
| *H04L 12/24* | (2006.01) |
| *G06F 11/30* | (2006.01) |

(52) U.S. Cl.
CPC .............. *G06F 8/65* (2013.01); *G06F 11/0709* (2013.01); *H04L 41/0813* (2013.01); *G06F 11/3006* (2013.01)

(58) Field of Classification Search
None
See application file for complete search history.

(56) References Cited

U.S. PATENT DOCUMENTS

| 7,278,163 | B2 * | 10/2007 | Banzhof et al. ................ 726/25 |
| 7,890,952 | B2 * | 2/2011 | Marion et al. ................ 717/176 |
| 8,135,775 | B1 * | 3/2012 | Anderson et al. ............ 709/203 |
| 8,271,966 | B2 * | 9/2012 | Bantz et al. ................... 717/168 |
| 2004/0003266 | A1 * | 1/2004 | Moshir et al. ................ 713/191 |
| 2006/0080658 | A1 * | 4/2006 | Marion et al. ................ 717/177 |
| 2006/0130042 | A1 * | 6/2006 | Dias et al. ..................... 717/168 |
| 2007/0240151 | A1 * | 10/2007 | Marl et al. ..................... 717/174 |
| 2008/0235678 | A1 * | 9/2008 | Bantz et al. ................... 717/171 |

OTHER PUBLICATIONS

Zeng, G., "A Reinforcement-learning Approach to Failure-detection Scheduling," Seventh Int'l Conf. on Quality Software [online], 2007 [retrieved Jun. 15, 2015], Retrived from Internet: <URL: http://ieeexplore.ieee.org/stamp/stamp.jsp?tp=&arnumber=4385492>, pp. 1-10.*

Beattie, S., et al. "Timing the Application of Security Patches for Optimal Uptime," Proceedings of the 16th Large Installation System Administration Conference [online], 2002 [retrieved Jun. 15, 2014], Retrieved from Internet: <URL: http://www.homeport.org/~adam/time-to-patch-usenix-lisa02.pdf>, pp. 101-110.*

(Continued)

*Primary Examiner* — Don Wong  
*Assistant Examiner* — Todd Aguilera  
(74) *Attorney, Agent, or Firm* — Knobbe, Martens, Olson & Bear, LLP

(57) ABSTRACT

A service manager component associated with a set of hosts receives an update to be implemented on the set of hosts. The service manager component can then determine a penalty model that approximates the likely impact associated with an error in the update. Based on the penalty model, the service manager component selects a first subset of hosts to receive and implement the update and an observation window to determine whether an error has emerged or has been detected. If no errors are detected during the observation window, the service manager component can select additional subsets and observations windows and repeat the process or, alternatively, implement the update in the remaining set of hosts and monitor the system until it receives the next update.

26 Claims, 6 Drawing Sheets

(56) References Cited

OTHER PUBLICATIONS

Wang, Y., et al., "A Stochastic Model for Optimizing the Patching Time of Software Bugs," 2010 [retrieved Jun. 15, 2014], Retrieved from Internet: <URL: http://www.dsu.edu/research/ia/documents/[25]-A-Stochastic-Model-for-Optimizing-the-Patching-Time-of-Software-Bugs.pdf>, pp. 1-7.*

Beres, Y., et al., "Optimizing Network Patching Policy Decisions," HP Laboratories [online], 2009 [retrieved Feb. 3, 2015], Retrieved from Internet: <URL: http://www.hpl.hp.com/techreports/2009/HPL-2009-153.pdf>, pp. 1-28.*

\* cited by examiner

MULTI-PHASE SOFTWARE DELIVERY

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public. To facilitate increased utilization of data center resources, virtualization technologies may allow a single physical computing device to host one or more instances of virtual machines that appear and operate as independent computing devices to users of a data center. With virtualization, a single physical computing device can create, maintain, delete, or otherwise manage virtual machines in a dynamic matter.

Regardless of whether virtualization technologies are utilized, users, via client computing devices, can transmit requests to computing devices, such as computing devices at data centers, to process data provided by, or on behalf of, the requesting client computing device, often referred to as a "Web service" or "service." The client computing devices can typically request the processing of data (e.g., a "service request") through the transmission of data that has been organized in accordance with a pre-established format, such as an Application Protocol Interface ("API"). For example, a user can access various data processing services via a browser-based software application hosted on the client computing device. Based on the information included in a client computing device service request, the receiving computing device processes the request and can return responsive data or confirm that the requested data processing has been completed. From the perspective of the user at the client computing device, the utilization of such services can provide the impression that the requested services are implemented on the client computing device.

In a typical embodiment, one or more third party service providers maintain various computing devices in a data center that process the client computing device service requests, generally referred to as hosts. Periodically, the third party service provider or data center provider may wish to implement updates, upgrades or other modifications to the software maintained by the hosts and utilized in conjunction with the processing of service requests. Despite substantial testing of any proposed updates, upgrades or modifications, any software modification to a service host may contain errors (e.g., "bugs"), some of which may be latent or not fully realized until the update, upgrade or modification has been implemented. However, the development or emergence of a software error once the software has been implemented across a fleet of hosts that provide a service can have a significant impact on the availability of the service and the potential damage caused to client computing devices or data associated with client computing devices.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, the present disclosure relates to the implementation and management of software in a networked based environment. More specifically, the present disclosure relates to the management of software that is to be implemented on multiple computing devices in accordance with a multi-phased distribution. Illustratively, aspects of the present disclosure will be described with regard to the implementation, configuration or incorporation of software updates, upgrades or other modifications, which will be generally referred to as "updates." Additionally, aspects of the present disclosure will be described with regard to the management of the updates on a set of client computing device hosts that correspond to service providers providing networked-based services. Although utilized for purposes of illustrative examples, one skilled in the art will appreciate that such illustrative examples should not necessarily be construed as limiting.

In accordance with an illustrative embodiment, a service manager component associated with a set of hosts receives an update to be implemented on the set of hosts. The service manager component can then determine a penalty model that approximates the likely impact associated with an error in the update. Based on the penalty model, the service manager component selects a first subset of hosts to receive and implement the update and an observation window to determine whether an error has emerged or has been detected. Illustratively, the selection of the number of hosts in the first subset and the observation window are based on optimizations of corresponding variables in a penalty model. If no errors are detected during the observation window, the service manager component can select additional subsets and observations windows and repeat the process or, alternatively, implement in the update in the remaining set of hosts.

Figure 1:
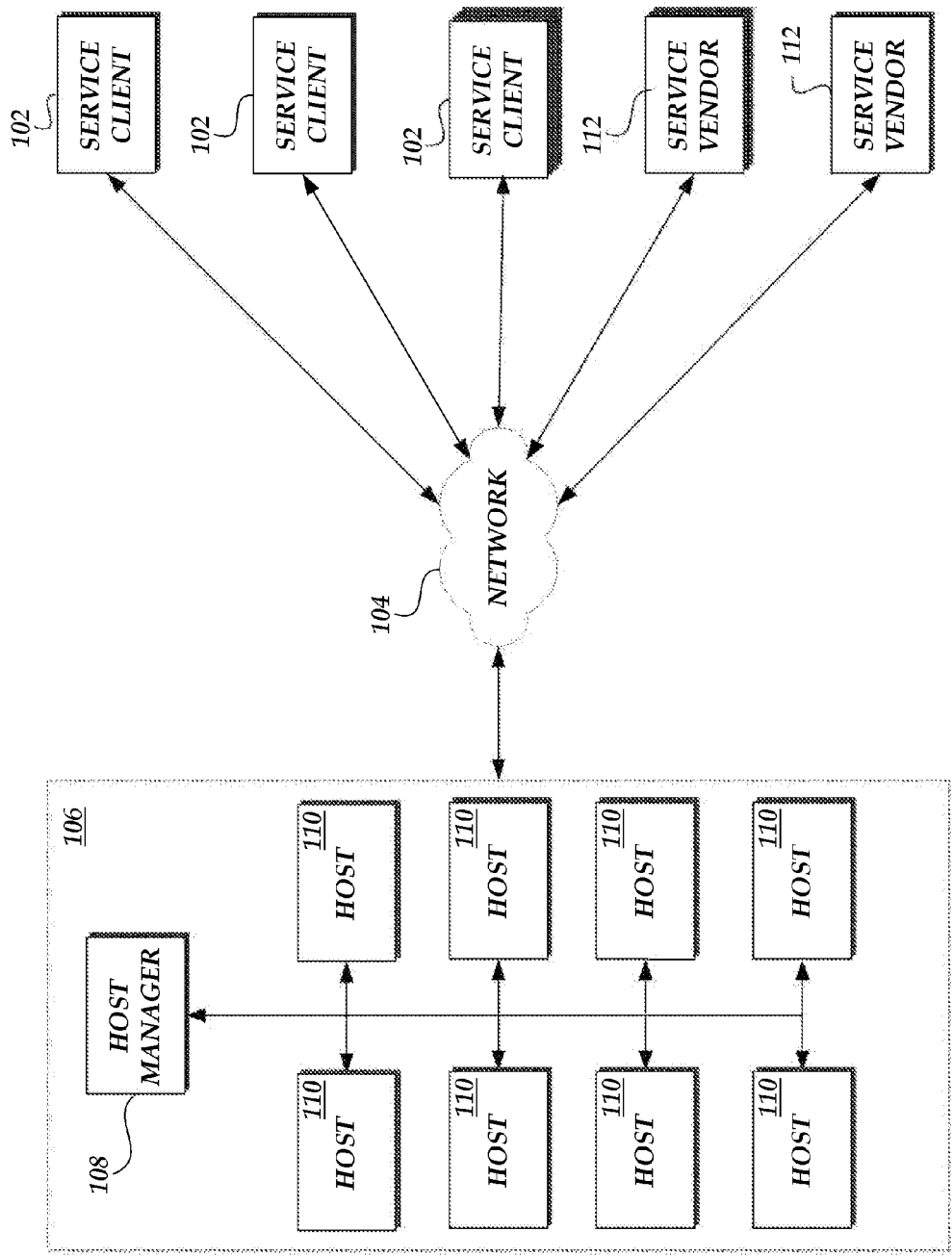
FIG. 1 is a block diagram illustrating an embodiment of a service provider network for providing network based services to service clients.

FIG. 1 is a block diagram illustrating an embodiment of a service provider network 100 for providing network based services. The service provider network 100 includes a number of service clients 102, such as client computing devices, that can request services from a service provider. The service clients 102 can correspond to individual computing devices, such as personal computing devices, mobile devices, servers, etc. that have been configured with software applications for transmitting service requests, such as via one or more APIs. The service clients 102 can also correspond to multiple computing devices or a grouping of a set of network computing devices that transmit service requests. The service clients 102 transmit requests via a communication network 104, such as the Internet, intranets, local area networks, wireless networks, wan access networks, and the like. The communication network may correspond to either public or private communication networks.

In communication with the service clients 102 via the communication network 104, is a service provider network 106 that is associated with a set of hosts for providing network based services responsive to service client requests. As illustrated in FIG. 1, the service provider network 106 includes a host manager component 108 that manages updates to a set of hosts 110. Illustratively, the set of hosts 110 can correspond to physical computing device implementing one or more software applications and communicating with other computing devices for processing service client requests. Additionally, at least some portion of the service provider network 106 can correspond to a hosted virtual machine network in which one or more of the set of hosts 110 are implemented as virtual machine instances in a physical computing device. Accordingly, the service provider network 106 should be considered as a logical representation of a set of hosts regardless of the manner in which such a logical representation is implemented on physical computing devices. Likewise, although the service provider network 106 is illustrated as interconnected, one skilled in the relevant art will appreciate that at least some portion of the service provider network 106 may be geographically distributed and interconnected via a private or public communication network.

Also in communication with the service provider network 106, via the communication network 104, are one or more service vendors or application providers 112. Illustratively, the service vendors 112 may include third party vendors that provide the software applications executed by the hosts to provide services. The service vendors may also correspond to an entity that also provides the service provider network 106 and does not necessarily have to correspond to a true third party. As will be described below, the service vendor 112 can provide the updates to be implemented on the hosts 110.

Figure 2A:
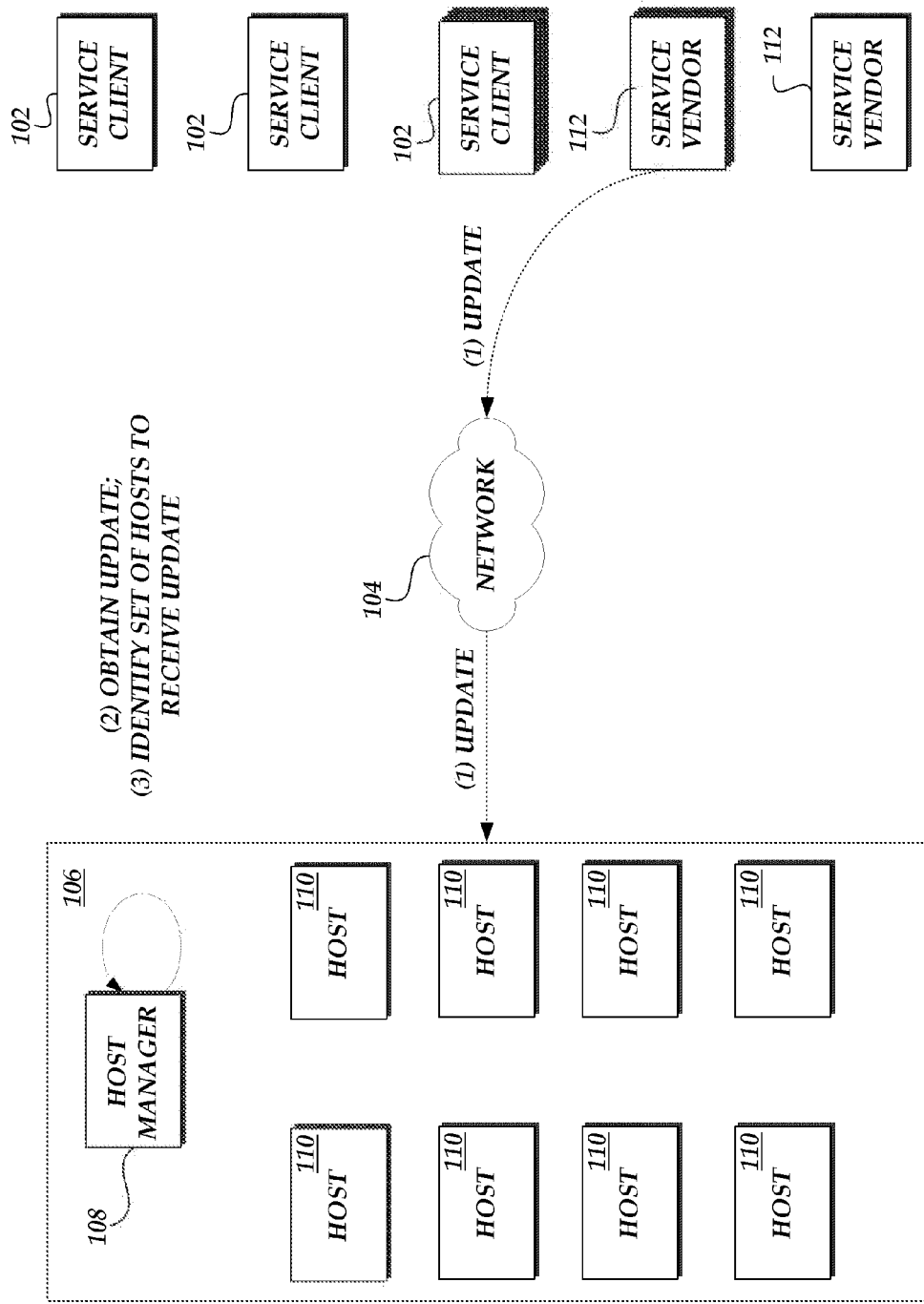
FIG. 2A is a block diagram of service provider network of FIG. 1 illustrating the transmission of updates or modifications to be implemented by a set of hosts associated with a service provider.
Figure 2B:
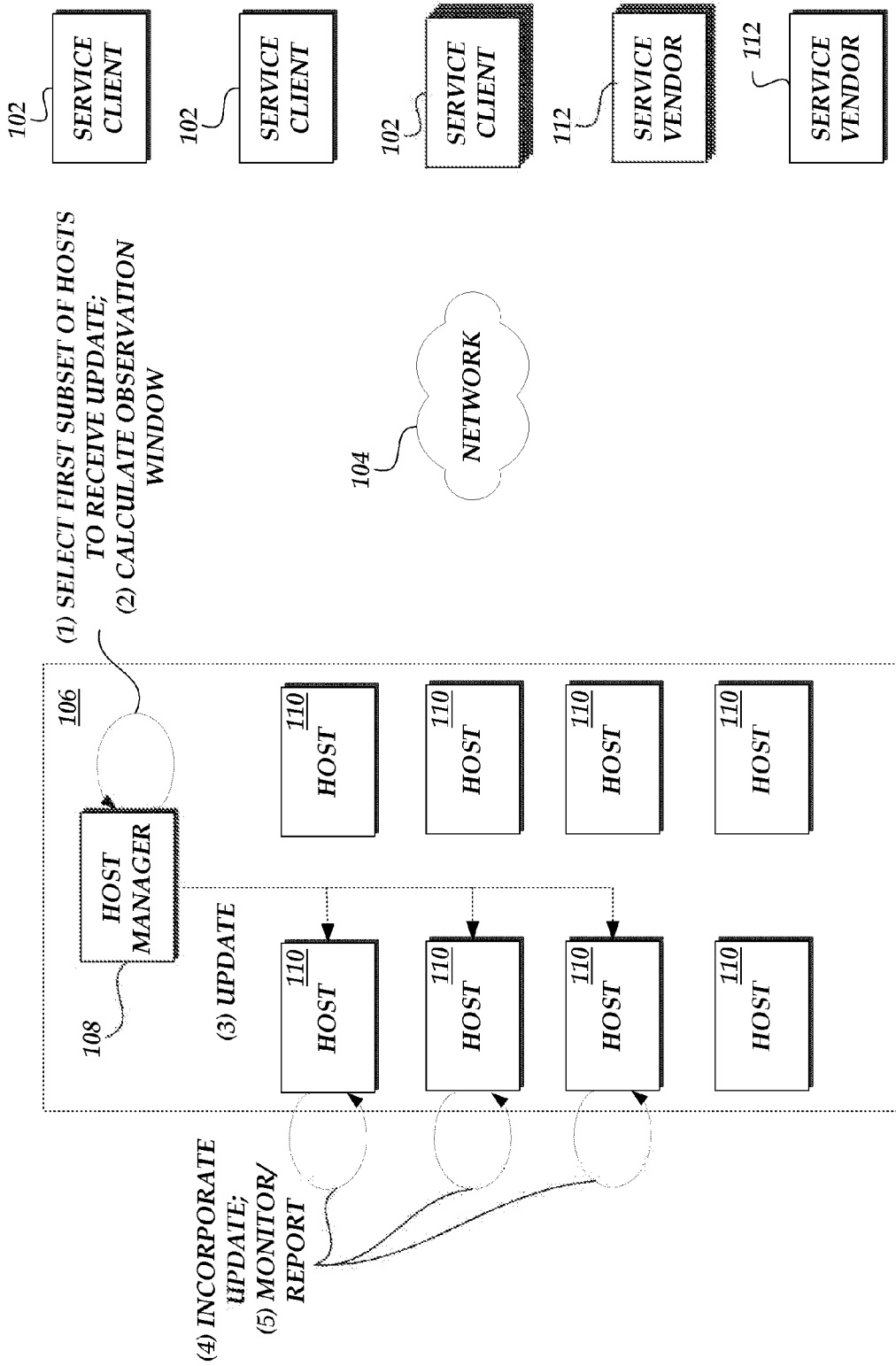
FIG. 2B is a block diagram of service provider network of FIG. 1 illustrating the selection of a first subset of hosts to implement an update or modification over a determined observation window.
Figure 2C:
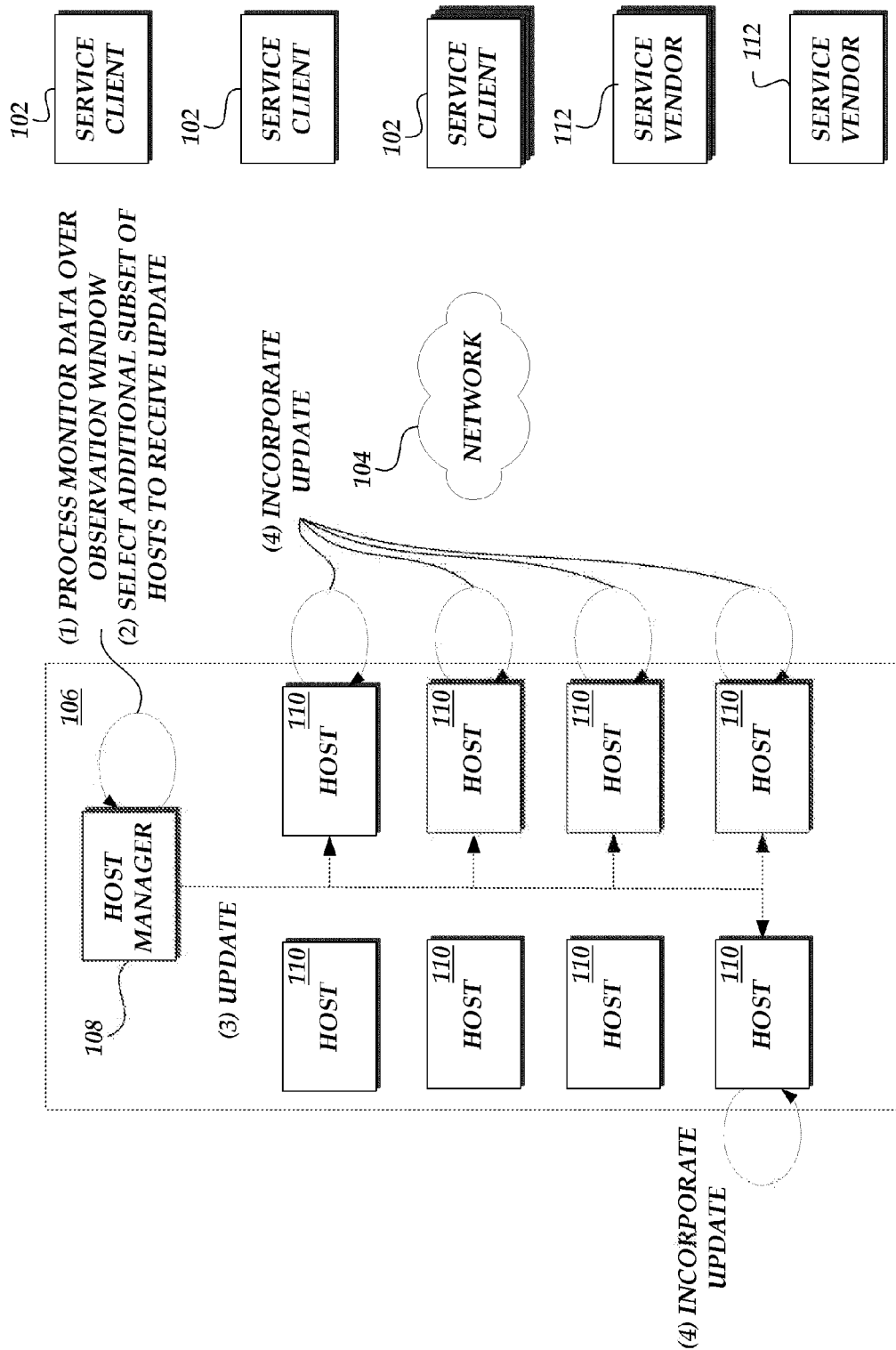
FIG. 2C is a block diagram of service provider network of FIG. 1 illustrating the selection of a second subset of hosts to implement an update or modification once the observation window has expired.

With reference now to FIGS. 2A-2C, various embodiments for the management of software updates on the service provider network 106 will be described. However, one skilled in the relevant art will appreciate that illustrative interaction and communications may include, or otherwise involve, additional components not illustrated in the illustrative drawing figures. With reference to FIG. 2A, a service vendor 112 transmits an update to be implemented on a set of hosts 110. The service vendor 112 can illustratively provide the update, which can correspond to an upgrade, modification, patch, configuration, and the like. The service vendor 112 can also transmit criteria for implementing the update including the identification of the hosts that should incorporate the update, timing for completion of the update, testing verification, troubleshooting information, etc. In the event the same entity that controls the service provider network 106 also corresponds to the service vendor 112, the illustrative interaction can occur within the service provider network 106 between one or more components. The service vendor update can correspond to software applications utilized in conjunction with the providing of services, such as an update to a database server application utilized in a content management service, but that do not expressly correspond to the service itself (e.g., the content management service). Additionally, the service vendor update can correspond to software application utilized specifically for the providing of services.

Upon receiving of the update, a host manager component 108 identifies the set of hosts 110 that will receive the update. In one example, the host manager component 108 can utilize information included in the transmission of the update that identifies one or more hosts 110 to receive the update or provides criteria for selecting the set of hosts 110. In another example, the host manager 106 can perform identify the set of hosts 110 to receive the update based on an affiliation with the service vendor 112, an identification of software applications corresponding to the update, hosts associated with a particular entity, and the like.

With reference to FIG. 2B, the host manager component 108 then determines a first subset of hosts 110 that will receive update and calculates an observation window for monitoring the implementation of the update on the first subset of hosts. Illustratively, the determination of the first subset of hosts 110, in terms of the number of hosts, and the observation window can be based on analysis of an assessment of the likely impact of an error emerging from the update, generally referred to as a penalty model. More specifically, the penalty model can be generated based on an estimated distribution of the time in which an error will first occur based on the implementation or, deployment and execution, of the update in a set of hosts and the estimate time that lapses between occurrence and correction of the error. Illustratively, the penalty model can be generic to all set of hosts and all types of updates. Alternatively, the penalty model may be customized to types of updates, types of hosts, types of operating systems, service clients 102, service vendors 112, or combinations thereof. A more detailed discussion of the determination of the number of hosts, and the observation window based on a penalty model will be described below. Based on the calculated number of hosts and observation window, the host manager component 108 then causes the implementation of the update on the selected first subset of hosts 110.

With reference now to FIG. 2C, the host manager component 108 processes all data corresponding to the monitoring of the implementation of the update on the first subset of hosts 110. The observations may be active by receiving reports (including prompting) from the first subset of hosts 110. Additionally, the observations may be passive by waiting for reporting of any type of error associated with the first subset of hosts. If an error is detected, the host manager component 108 can implement mitigation techniques, such as recalling the update, restoring a previous version of the software application, reconfiguration of the first subset of hosts, etc. If no errors are detected during the observation window, the host manager component 108 can then select additional subset of hosts for further testing or cause the deployment and execution of the update on the remaining hosts previously identified. Illustratively, the host manager component can implement any number of deployment and execution phases in the deployment and execution of an update. Additionally, the host manager component 108 can continuously monitor the execution of an update once it has been deployed on the set of hosts. In this regard, the final observation window for deployment on all the set of hosts can be considered to be equal to the remaining time until the next update will be deployed, which is generally referred to as a cycle time.

Figure 3:
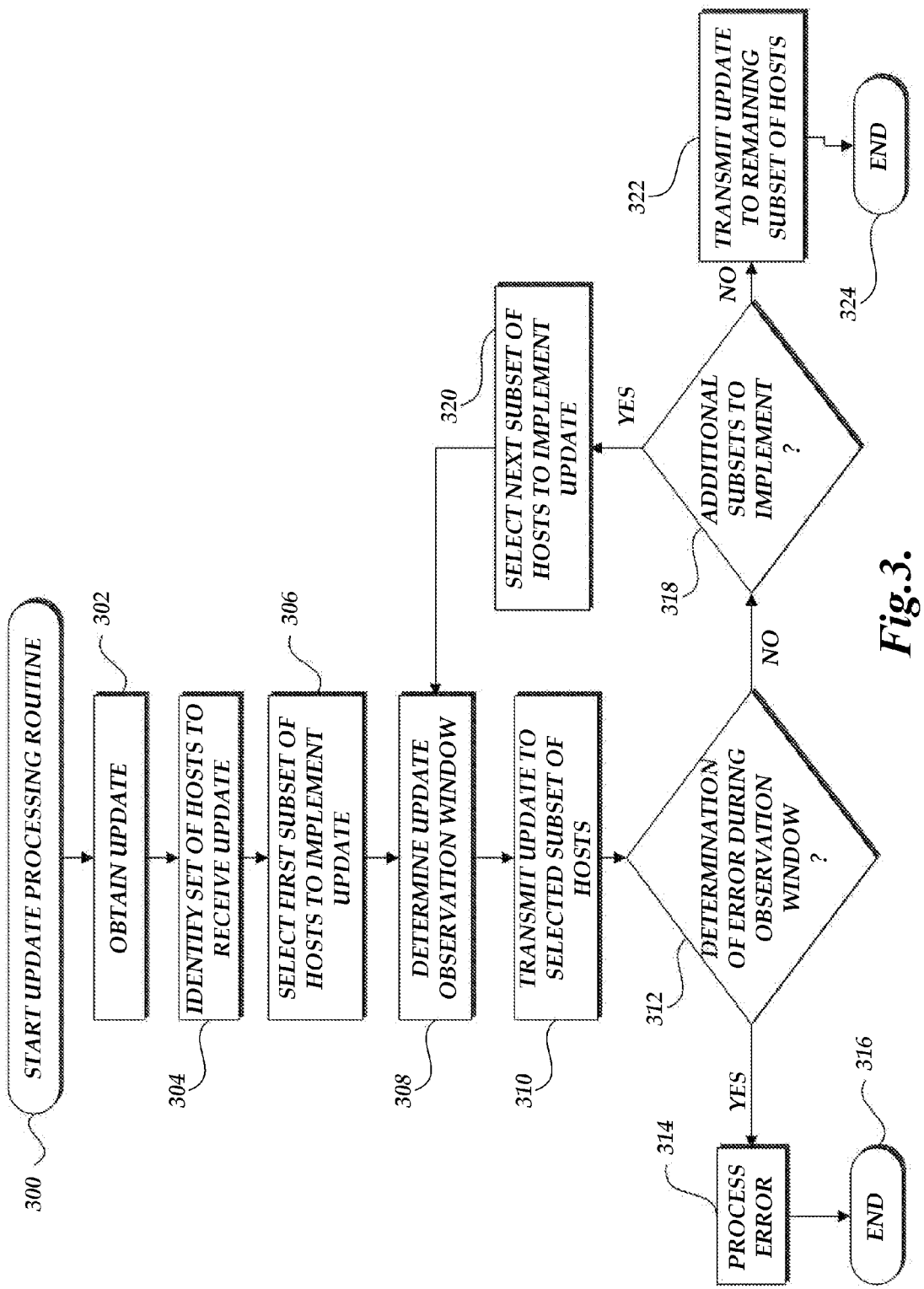
FIG. 3 is a flow diagram of an update processing routine implemented by a service manager component.

Turning now to FIG. 3, a routine 300 implemented by a component, such as a host manager component 108 (FIG. 1) for processing updates will be described. Although routine 300 will be described with regard to implementation by a host manager component 108, the routine may be implemented by any number of components or combination of components. At block 302, the host manager component 108 obtains an update for implementation on a set of hosts 110. As previously described, the update may be provided by service vendor 112, such as a third party service vendor. At block 304, the host manager component 108 determines the set of hosts that will receive the update. In one embodiment, the update may identify the set of hosts that are to receive the update. In another embodiment, the update may identify criteria that will be utilized by the host manager component 108 to identify the set of hosts. In a further embodiment, the host manager component 108 may identify the set of hosts independently from the receipt of the update.

At block 306, the host manager component 108 determines a first subset of hosts to implement the update. At block 308, the host manager component 108 then determines an update observation window. As previously described, illustratively, the host manager component 108 can identify a penalty model that assesses a penalty based on a distribution of the time in which an error will first occur during the execution of the deployed update and the likely time between the emergence of an error and the ability to remedy the error. The penalty models may be generic to all updates for the service provider network 106. Alternatively, the penalty model may be customized to specific updates, types of updates, types of service vendors, and the like. Based on the identified penalty model, the host manager component 108 selects values for the number of hosts in the first subset and the observation windows to minimize the assessed impact, e.g., the penalty in the penalty model. A more detailed discussion of illustrative penalty models and optimizations will be described with regard to FIG. 4, below.

At block 310, the host manager component 108 transmits the update to the selected hosts in the first subset of hosts. At decision block 312, a test is conducted to determine whether an error has occurred during the determined observation window. If so, at block 314, the host manager component 108 processes the error and routine 300 ends at block 316. Illustratively, the host manager component 108 can implement various mitigation techniques in the event an error is detected including restoring previous versions of software application, instantiating new virtual instances of a host (with previous versions of software applications), turning off features, and the like. One skilled in the relevant art will appreciate that decision block 312 may correspond to a loop that is executed throughout the observation window.

If no errors are detected during the observation window, at decision block 318, a test is conducted to determine whether the host manager component 108 should implement the update on additional subsets of hosts. Illustratively, the host manager component 108 may implement the update in a plurality of phases in which each phase may increase the number of hosts that receive the update. If additional subsets of hosts are to receive the update, at block 320, the host manager component 108 determines the next subset of hosts to receive the update and the routine 300 returns to block 308. Illustratively, the next subset of hosts can correspond to an incremental number of hosts to the first subset of hosts that have received and implemented the update. Alternatively, the next subset of hosts can correspond to an independently determined subset of hosts that may or may not have any overlap with the first subset of hosts. Still further, in another embodiment, the next subset of hosts can corresponds to any remaining hosts in the set of hosts that have not yet deployed the update. In this embodiment, the host manager component 108 can set the observation window determined in block 308 to be equal to, or least substantially close, to the time remaining for the deployment of the update in the set of hosts (e.g., observing the set of hosts for the remainder of the release cycle).

If no additional subsets of hosts are to receive the update, at block 322, the routine 300 terminates at block 324.

Figure 4:
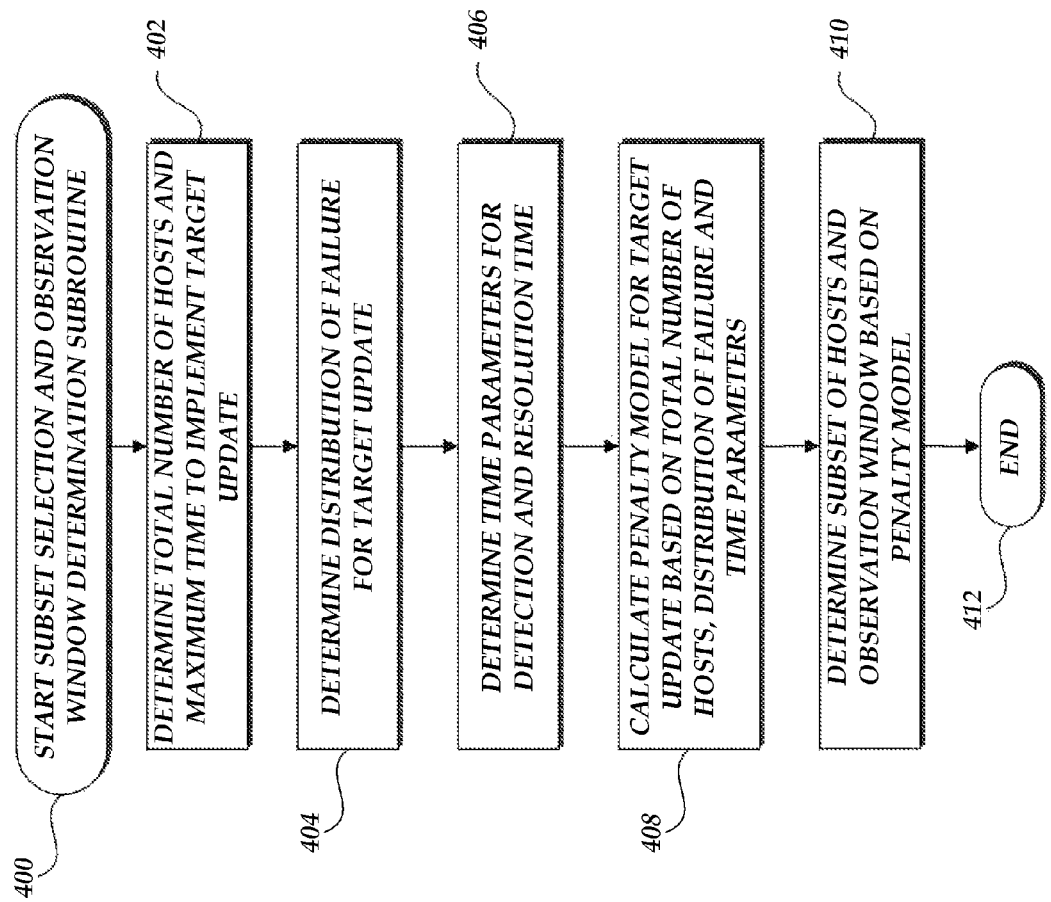
FIG. 4 is a flow diagram of a subset and observation window determination subroutine implemented by a service manager component.

With reference now to FIG. 4, a subroutine 400 for determining a number of hosts in a subset of hosts and an observation window based on a penalty model will be described. Illustratively, subroutine 400 may be implemented by a host manager component 108 or other components associated with the service provider network 106. At block 402, the host manager component 108 determines the total number of hosts and a maximum amount of time to implement a target update. As previously described, the host manager component 108 can utilize criteria provided by a service vendor 112 associated with the target update to determine the total number of hosts. Alternatively, the host manager component 108 can make an independent determination of the total number of hosts. Likewise, the maximum amount of time to implement a target update may correspond to defaults set by the service provider network 106, the service vendor 106, service level agreements or in accordance with an established scheduled for implementing updates.

At block 404, the host manager component 108 determines a distribution of time to an occurrence of a first failure for the target update. Illustratively, the distribution of time to a first failure corresponds to an approximation of the time in which a failure based on execution of a deployed update will occur. Illustratively, the distribution of time to a first failure can be represented as an exponential distribution. The distribution of time to a first failure may be generic to all service providers or based, at least in part, on specific service providers, service vendors, types of updates, types of services, etc. The distribution of time to a first failure may also be based on historical data. At block 406, the host manager component 108 determines time parameters associated with a time between emergence of an error and the mitigation of the error. As previously described, the host manager component 108 may cause the implementation of various mitigation techniques that may depend on the type of error that may have emerged or the type of update involved. Depending on the complexity of the mitigation technique, there may be a specific amount of time in which an error is present (and perhaps known), but cannot yet be mitigated. During this time, the "penalty" is incurred by the service provider.

At block 408, the host manager component 108 calculates a penalty model based on the total number of hosts, distribution of time to a first failure and time parameters. Illustratively, the penalty model can correspond to assessment of the impact if an error is found during execution of the update on a first subset of hosts within the current observation window and if an error is found during execution of the update on a larger subset of hosts within the next observation window. The below equation corresponds to an illustrative penalty model for a two-phase deployment:

$$P(n,t) = n \cdot \lambda \cdot D \cdot (1 - e^{-n \cdot \lambda \cdot t}) + e^{-n \cdot \lambda \cdot t} \cdot N \cdot \lambda \cdot D \cdot (1 - e^{-N \cdot \lambda \cdot (C - t)})$$

where $0 < n \leq N$ and $0 < D \leq t \leq T \ll C$ and where

P: assessed penalty for errors in an update n: number of hosts to be selected in the first subset of hosts;

t: observation window/delay (e.g., a current observation window)

$\lambda$: rate parameter of an exponential distribution modeling time to first failures; $1/\lambda$ is the expected time to first failures D: time interval between error occurrence and error detection and removal N: total number of hosts T: upper bound for current observation window C: time for next scheduled update (e.g., the release cycle)

At block 410, the host manager component determines values for the number of hosts to be selected in the first subset of hosts and observation window based on the penalty model. As illustrated above, the illustrative penalty model factors in a penalty for an error occurring during execution of the update on a first subset, "n," within the first observation window namely, $n \cdot \lambda \cdot D \cdot (1-e^{-n \cdot \lambda \cdot t})$. The illustrative penalty model also factors in a penalty for an error occurring during execution of the update on all the hosts within the second observation window (whose size is the release cycle minus the size of the first observation window), namely, $e^{-n \cdot \lambda \cdot t} \cdot N \cdot \lambda \cdot D \cdot (1-e^{-N \cdot \lambda \cdot (C-t)})$. Accordingly, the host manager component attempts to optimize the penalty model such that the penalty for an error occurring during implementation in all the hosts is minimal. In one embodiment, the optimization of the penalty model is achieved via selection of different values for number hosts, "n," and the observation window, "t."

Illustratively, the host manager component 108 can implement the optimization process by selecting a value for "n" to minimize the penalty model for any given value of t. Specifically, the host manager component 108 can utilize the first and second partial derivatives of the penalty model equation with respect to "n" to model the change in penalty model. Illustratively, based on a single root of the first partial derivative, the host manager component 108 can determine an optimal "n" having a value between "0" (e.g., indicative of an exclusive subset from the set of hosts) and "N" (e.g., indicative of an inclusive subset including all the set of hosts). Additionally, "T" is always an optimal value of "t" for this model. Still further, when "N" is an optimal value of "n," the two-phase deployment degenerates to one-phase deployment, and the two observation windows merge into a single observation window whose size is "C," the release cycle.

At block 412, the subroutine 400 terminates with the identification of the optimal values for n and t.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing updates to a set of hosts associated with a service provider, comprising:

obtaining an update to be implemented on the set of hosts maintained by the service provider;

characterizing a penalty associated with an error occurring during deployment of the update by a first subset of the set of hosts and an error occurring during deployment of the update by the set of hosts;

determining a number of the first subset of hosts and an observation window as a function of the characterization of the penalty associated with an error occurring during deployment of the update by a first subset of the set of hosts and an error occurring during deployment of the update by the set of hosts, wherein determining the number of the first subset of hosts is based, at least in part, on minimizing the penalty;

causing the deployment of the update in the first subset of hosts corresponding to the determined number of the first subset of hosts; and when no error is detected during the determined observation window, causing the deployment of the update in the set of hosts.

2. The method as recited in claim 1, wherein the characterization of the penalties are based on an assessed distribution of time to first failure and a time from determination of failure and implementation of a mitigation technique.

3. The method as recited in claim 2, wherein the assessed distribution of time to first failure is generic to all updates.

4. The method as recited in claim 2, wherein the assessed distribution of time to first failure is unique to a type of update.

5. The method as recited in claim 2, wherein the assessed distribution of time to first failure is unique to a type of host.

6. The method as recited in claim 2, wherein the time from determination of failure and implementation of a mitigation technique is generic to all updates.

7. The method as recited in claim 2, wherein the time from determination of failure and implementation of a mitigation technique is unique to a type of update.

8. The method as recited in claim 1, wherein characterizing a penalty associated with an error occurring during deployment of the update by a first subset of the set of hosts and an error occurring during deployment of the update by the set of hosts includes characterizing the penalty associated with an error occurring during deployment of the update by a first subset of the set of hosts and an error occurring during deployment of the update by the set of hosts as $P(n,t) = n \cdot \lambda \cdot D \cdot (1-e-n \cdot \lambda \cdot t) + e-n \cdot \lambda \cdot t \cdot N \cdot \lambda \cdot D \cdot (1-e-N \cdot \lambda \cdot (C-t))$ and wherein:

P corresponds to the penalty;
n corresponds to the number of the first subset of hosts;
t corresponds to the observation window;
λ corresponds to a rate parameter of an exponential distribution modeling time to occurrence of first errors;
D corresponds to a time interval between error occurrence and error detection and removal;
N corresponds to a number of the set of hosts;
T corresponds to an upper bound for the current observation window; and
C corresponds to a time for a next scheduled update.

9. The method as recited in claim 1 further comprising, prior to causing the implementation of the updated in set of hosts:
  determining a number of a second subset of hosts and a second observation window as a function of the characterization of the penalties associated with an error occurring during deployment of the update by a first subset of the set of hosts and an error occurring during deployment of the update by the set of hosts;
  causing the deployment of the update in a second subset of hosts corresponding to the determined number of the second subset of hosts; and
  when no error is detected during the determined second observation window, causing the deployment of the update in the set of hosts.

10. A system for managing updates comprising:
  a set of hosts for providing services to service clients, the set of hosts each including a processor and maintaining software applications;
  a host manager component, implemented on a computing system including one or more processors and memory, the host manager component operative to:
  obtain an update to be deployed on one or more hosts;
  determine the set of hosts to receive the update;
  characterize a penalty associated with an error occurring during execution of the update by a first subset of the set of hosts and an error occurring during execution of the update by the set of hosts;
  determine a number of the first subset of hosts and an observation window as a function of the characterization of the penalty associated with an error occurring during execution of the update by a first subset of the set of hosts and an error occurring during execution of the update by the set of hosts, wherein the number of the first subset of hosts is determined based, at least in part, on minimizing the penalty;
  cause the execution of the update in the first subset of hosts corresponding to the determined number of the first subset of hosts; and
  when no error is detected during the determined observation window, causing the execution of the update in the set of hosts.

11. The system as recited in claim 10, wherein the characterization of the penalties are based on an approximation of a time to a first failure and a time from determination of failure and implementation of a mitigation technique.

12. The system as recited in claim 11, wherein the assessed rate of failure is at least one of generic to all updates, unique to a type of update and unique to a type of host.

13. The system as recited in claim 11, wherein the time from a determination of failure and implementation of a mitigation technique is at least one of generic to all updates, unique to a type of update and unique to a type of host.

14. The system as recited in claim 10, wherein the host manager component determines the set of hosts from information received from a service vendor.

15. The system as recited in claim 10, wherein the host manager component determines a number of the first subset of hosts and an observation window as a function of the characterization of the penalties associated with an error occurring during execution of the update by a first subset of the set of hosts and an error occurring during execution of the update by the set of hosts based on an optimization of a penalty model.

16. The system as recited in claim 15, wherein the penalty model is represented as $P(n,t) = n \cdot \lambda \cdot D \cdot (1 - e^{-n \cdot \lambda \cdot t}) + e^{-n \cdot \lambda \cdot t} \cdot N \cdot \lambda \cdot D \cdot (1 - e^{-N \cdot \lambda \cdot (C-t)})$ and wherein:
  P corresponds to the penalty;
  n corresponds to the number of the first subset of hosts;
  t corresponds to the observation window;
  λ corresponds to a rate parameter of an exponential distribution modeling time to occurrence of first errors;
  D corresponds to a time interval between error occurrence and error detection and removal;
  N corresponds to a number of the set of hosts;
  T corresponds to an upper bound for the current observation window; and
  C corresponds to a time for a next scheduled update.

17. A method for managing updates to a set of hosts associated with a service provider, comprising:
  obtaining an update from a service vendor associated with the set of hosts to receive the update;
  determining a penalty model associated with the implementation of the update on the set of hosts, the penalty model characterizing a penalty associated with an error occurring during implementation of the update by a first subset of the set of hosts and an error occurring during implementation of the update by the set of hosts;
  optimizing the penalty model to determine a number of the first subset of hosts and an observation window, wherein optimizing the penalty model includes selecting the number of the first subset of hosts based, at least in part, on minimizing the penalty in association with the observation window;
  causing the implementation of the update in the first subset of hosts corresponding to the determined number of the first subset of hosts; and
  when no error is detected during the determined observation window, causing the implementation of the update in the set of hosts.

18. The method as recited in claim 17, wherein obtaining an update from a service vendor includes obtaining an update from a third party service vendor.

19. The method as recited in claim 17, wherein determining a penalty model associated with the implementation of the update on the set of hosts includes characterizing the penalty associated with an error occurring during implementation of the update by a first subset of the set of hosts and an error occurring during implementation of the update by the set of hosts based on an assessed time to occurrence of a first failure and a time from determination of failure and implementation of a mitigation technique.

20. The method as recited in claim 17, wherein the penalty model is represented as $P(n,t) = n \cdot \lambda \cdot D \cdot (1 - e^{-n \cdot \lambda \cdot t}) + e^{-n \cdot \lambda \cdot t} \cdot N \cdot \lambda \cdot D \cdot (1 - e^{-N \cdot \lambda \cdot (C-t)})$ and wherein:
  P corresponds to the penalty;
  n corresponds to the number of the first subset of hosts;
  t corresponds to the observation window;
  λ corresponds to a rate parameter of an exponential distribution modeling time to occurrence of first errors;
  D corresponds to a time interval between error occurrence and error detection and removal;
  N corresponds to a number of the set of hosts;

T corresponds to an upper bound for the current observation window; and

C corresponds to a time for a next scheduled update.

21. The method as recited in claim 17, wherein optimizing the penalty model to determine a number of the first subset of hosts and an observation window includes:

determining a root value for all potential values of the number of hosts in the first subset across a total time for implementing the update; and comparing minimal value pairs for the determined root value.

22. The method as recited in claim 21, wherein optimizing the penalty model further includes utilizing a determined optimal value for the number of hosts in the first subset of the set of hosts to determine an optimal time for the observation window.

23. The method as recited in claim 17 further comprising implementing a mitigation technique if an error is detected during the observation window.

24. The method as recited in claim 17 further comprising, prior to causing the implementation of the updated in set of hosts:

optimizing the penalty model to determine a number of a second subset of hosts and a second observation window;

causing the implementation of the update in a second subset of hosts corresponding to the determined number of the first subset of hosts; and if no error occurs during the determined second observation window, causing the implementation of the update in the set of hosts.

25. The method as recited in claim 17, wherein the update corresponds to at least one of an update, upgrade or modification.

26. The method as recited in claim 17, wherein the set of hosts correspond to at least one of a service provider and a service vendor.

\* \* \* \* \*